United States Patent [19]

Stevens

[11] 3,893,580

[45] July 8, 1975

[54] SIDE AND FRONT TILTABLE LIFT TRUCK MAST

[75] Inventor: Daryl W. Stevens, Battle Creek, Mich.

[73] Assignee: Clark Equipment Company, Buchanan, Mich.

[22] Filed: Dec. 12, 1973

[21] Appl. No.: 424,121

[52] U.S. Cl. .............................. 214/672; 214/670
[51] Int. Cl. .............................................. B66f 9/20
[58] Field of Search .......... 214/660, 670, 671, 672, 214/673, 674, 75 G

[56] References Cited
UNITED STATES PATENTS

| | | | |
|---|---|---|---|
| 3,490,633 | 1/1970 | Avis et al. | 214/670 |
| 3,515,301 | 6/1970 | Emke | 214/670 |

FOREIGN PATENTS OR APPLICATIONS

| | | | |
|---|---|---|---|
| 182,497 | 2/1963 | Sweden | 214/670 |
| 1,218,553 | 1/1971 | United Kingdom | 214/670 |
| 190,438 | 7/1964 | Sweden | 214/670 |

Primary Examiner—Robert J. Spar
Assistant Examiner—Lawrence J. Oresky
Attorney, Agent, or Firm—John C. Wiessler

[57] ABSTRACT

A lift truck mast supported from the truck frame by a main pair of universal connectors such as spherical bearings, a pair of tilt cylinders connected to the mast and to the truck by pairs of universal connectors for tilting the mast forwardly of the truck on said main pair of connectors, a side tilt cylinder connected to the mast for tilting the mast transversely of the truck on said main pair of connectors, and a side shift cylinder for actuating the mast laterally of the truck.

21 Claims, 6 Drawing Figures

SIDE AND FRONT TILTABLE LIFT TRUCK MAST

BACKGROUND OF THE INVENTION

The field of art to which the invention pertains includes elevators, and more specifically portable elevators.

Heretofore various means have been devised for mounting a lift truck mast so that the mast can be tilted or pivoted from side-to-side about an axis longitudinal of the truck, as well as being tiltable forwardly and rearwardly about an axis transverse of the truck and being also in some instances shiftable from side-to-side in a plane transverse of the truck, and even skewed about a vertical axis. One exemplary means for variously manipulating a lift truck mast is disclosed in U.S. Pat. No. 3,515,301, and other such exemplary means in United Kingdon Pat. No. 1,218,553 and Swedish Pat. No. 182,497.

Various other means have been proposed heretofore for tilting a lift truck mast transversely of the truck, all for the primary purpose of maintaining a mast, particularly under load, in a substantially vertical position when a lift truck operates transversely of a grade which would otherwise cause the mast to tilt with the truck thereby shifting the center of gravity toward one side of the truck which tends to seriously impair lateral stability. Also, if the mast is not maintained in a substantially vertical position it may be difficult to properly handle a load supported from the load support means.

It has also been found to be important to provide means for actuating the entire mast assembly laterally of the truck, otherwise known as side shifting the mast, which provides greater flexibility for the operator and greater flexibility and speed in engaging and depositing loads at particular locations.

SUMMARY

My invention is a substantial improvement over any prior known device providing side tilt capability in a lift truck mast, particularly in the use of means which provides for universal multiple point mast support on the truck in a compact structure which is relatively low in cost while providing a relatively rugged and fully operator controlled structure for at least forward and transverse tilting of the mast, and preferably also for side shifting of the mast.

It is therefore a primary object of the invention to provide much improved and novel apparatus for mounting a mast on a lift truck in a manner to provide for tilting the mast both forwardly and transversely of the truck.

An important feature provides transversely spaced spherical bearings mounting the mast from the lift truck and other structure associated therewith for movement in a plurality of directions in relation to the lift truck in order to facilitate a relatively low cost, compact and structurally simple device having flexible operating characteristics.

DESCRIPTION OF THE PREFERRED EMBODIMENT

Figure 1:
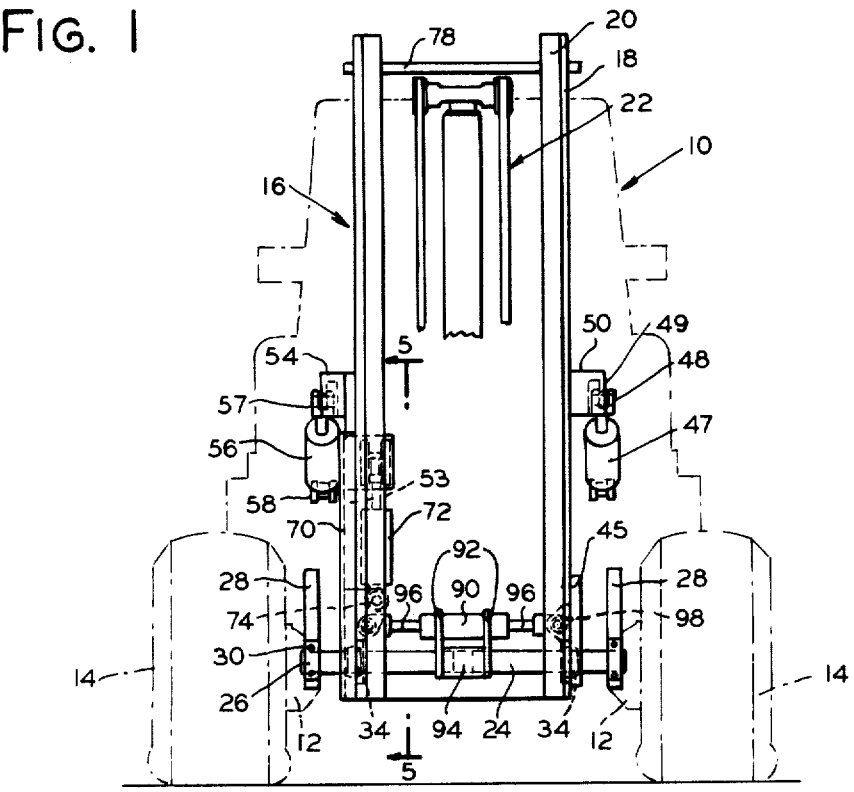
FIG. 1 is a front elevational view of a portion of a lift truck mast mounted from the front of a lift truck which is located on a horizontal surface.

An industrial lift truck is represented at numeral 10 in phantom outline. It is of a type adapted for operations in relatively rough outdoor terrain, preferably utilizing a hydrostatic drive system such as is disclosed, for example, in copending application Ser. No. 406,768, filed Oct. 15, 1973, common assignee, hydrostatic front drive motor housing portions being shown at numeral 12 associated with each front drive wheel 14.

A telescopic lift mast assembly generally of conventional construction is shown in partial elevational view at numeral 16 and includes the usual outer fixed pair of mast members 18 inner telescopic members 20, hydraulic lift motor and associated lifting chains and other parts 22 mounted in the mast and adapted to elevate a load carriage and load handling fork or other mechanism, not shown.

The mast assembly is mounted immediately adjacent the front of the truck and inwardly of the wheels 14, as shown, on a transverse support shaft 24 which is secured at its ends in split trunnion members 26 preferably formed at the front ends of a pair of longitudinal extending truck frame members 28. The split trunnions are secured together such as by studs 30 which facilitate the ready assembly and disassembly of the entire mast assembly 16 on the truck.

It will be understood that my invention is not restricted to being mounted on any particular type of truck, such as the hydrostatic drive machine illustrated, but may, for example, be mounted upon machines or lift trucks having a conventional differential drive axle between wheels 14 and bracket members secured to said axle for supporting an upright assembly 16 in place of the support thereof by frame members 28.

Figure 6:
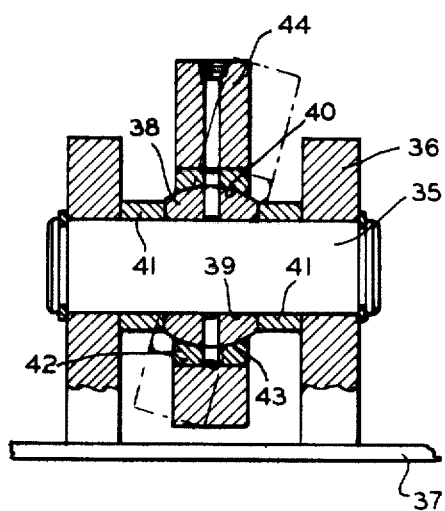
FIG. 6 is a view in section of a spherical bearing and mounting therefor.

The mast assembly is supported on shaft 24 by a pair of transversely spaced bearing assemblies 34 preferably of a type known as spherical bearings such as is shown in section in FIG. 6 mounted on a pin 35 supported in a bracket 36 from a plate 37. An inner ball member 38 having an inner cylindrical bearing surface 39 and an outer spherical bearing surface 40 may be fixed on the pin for non-sliding movement as by shims 41 or may be mounted for axial sliding movement on a shaft such as 24. An outer cylindrical race 42 having an inner partial spherical surface 43 is mounted for universal movement on the inner ball 38 and is adapted to support the mast, the yoke 44 of a tilt cylinder as in FIG. 6, or any other suitably connected element for universal movement on ball 38. Bearings of the type contemplated are manufactured, for example, by the Torrington Company of South Bend, Indiana. In mast construction where side shifting of the mast is not desired such bearing means may be fixed in axial positions on stub shafts mounted in yokes from the forward ends of frame members of the truck such as illustrated at numeral 28. In the embodiment illustrated, as will be described in detail beleow, side shifting of the mast, as well as side and forward tilting thereof, is provided, and so bearing assemblies 34 are mounted for sliding movement axial of shaft 24.

Figure 4:
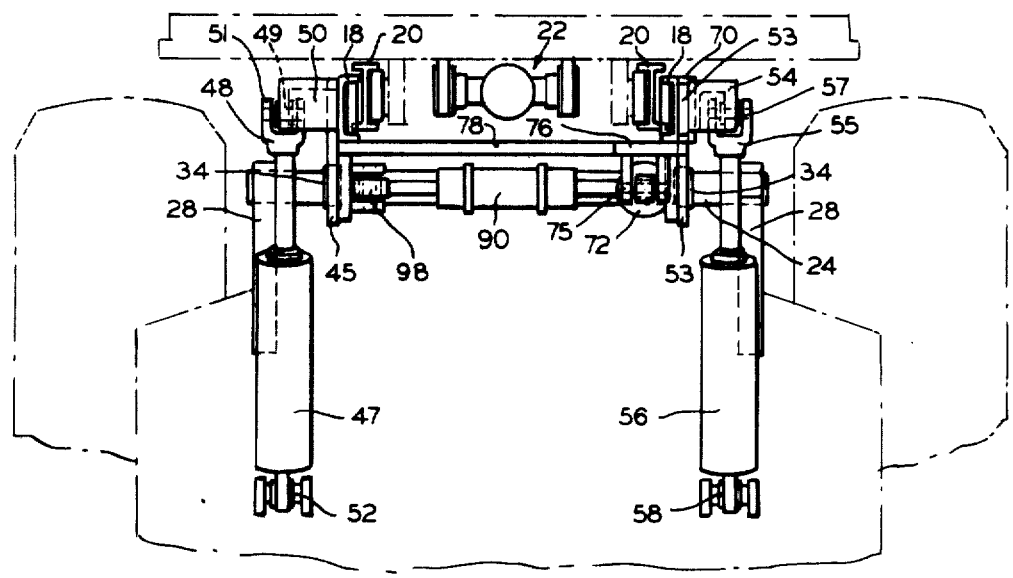
FIG. 4 is an enlarged plan view of the mast of FIG. 1.

The mounting of the mast assembly on bearings 34 is accomplished by securing, as by welding, to the outer side of the left-hand fixed rail 18, as seen in FIG. 4, a plate 45. The plate 45 is secured rigidly to the outer race of left-hand spherical bearing 34 in a manner similar to the mounting of element 44 on race 42 in FIG. 6. A tilt cylinder assembly 47, as shown, is connected to the mast above plate 45 by a double yoke and spherical bearing assembly which comprises a pin and yoke 48 at the rod end of the cylinder and a yoke 49 formed in the end of a bracket 50 which is secured to the outside of the said side of mast section 18. The yoke 49 is mounted on a spherical bearing assembly 51 which is mounted on the pin. The base end of the cylinder assembly is connected to the truck frame by a spherical bearing assembly 52.

Figure 2:
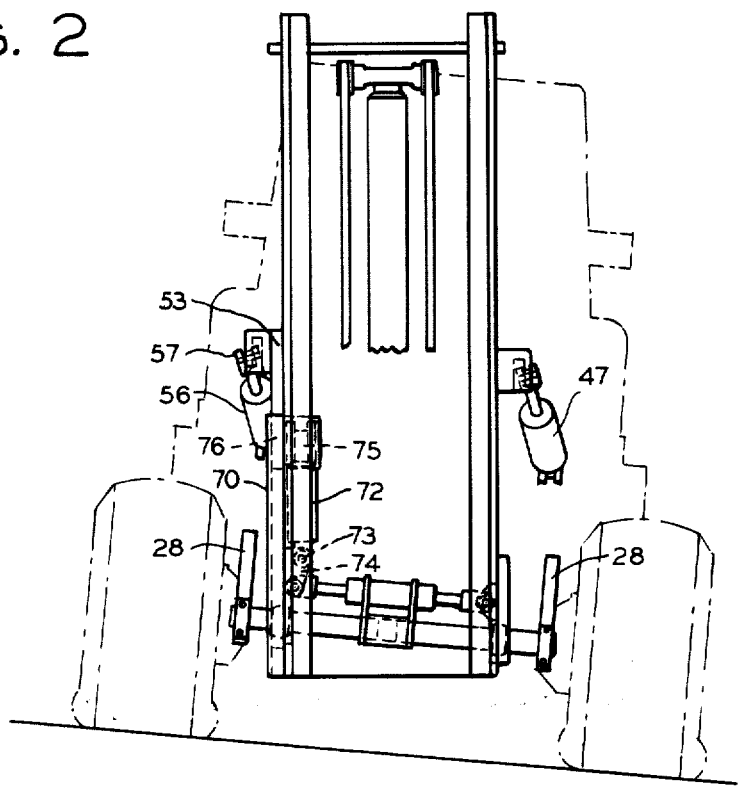
FIG. 2 is a view as in FIG. 1, but the lift truck is shown traversing a grade with the mast located in a vertical position as in FIG. 1.
Figure 3:
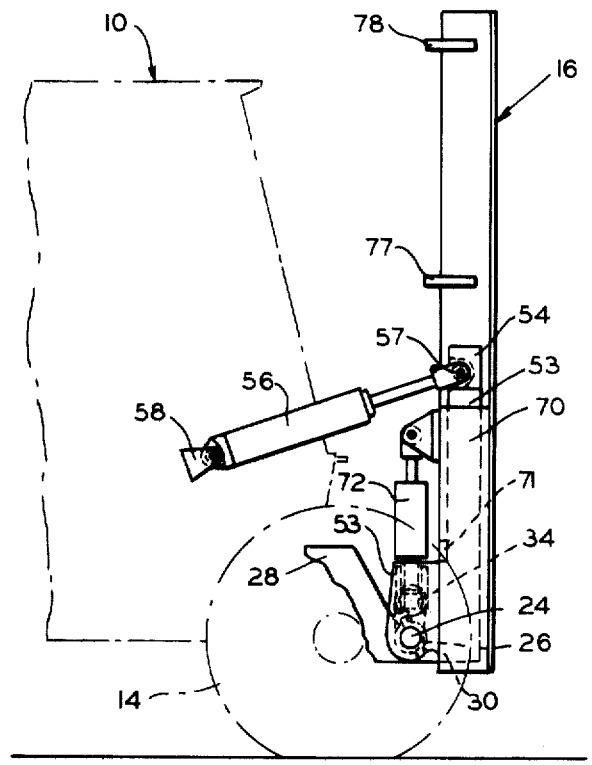
FIG. 3 is a side elevational view of FIG. 1.
Figure 5:
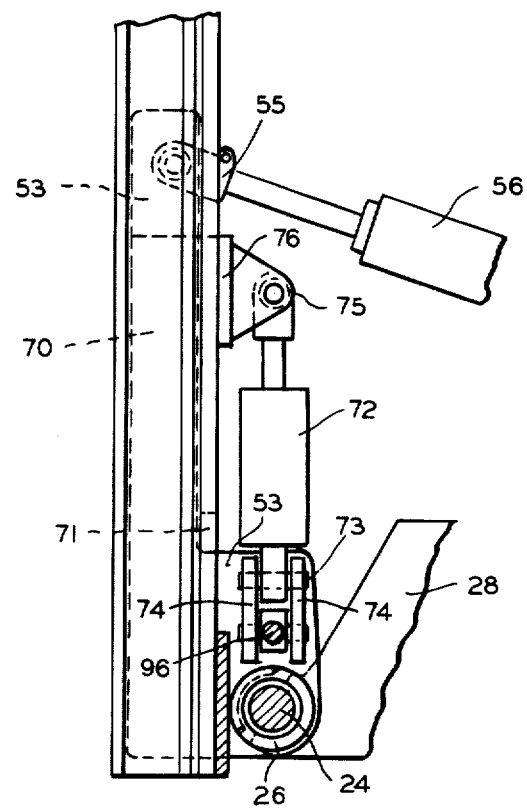
FIG. 5 is an enlarged view in partial section taken along line 5—5 of FIG. 1.

The opposite side of the upright is mounted from the other bearing 34 by means of a rearwardly extending L-shaped plate 53 which is secured in the horizontal portion thereof to the outer race of the other bearing 34 at an opening in the plate. Plate 53 is connected at its upper end to an outwardly extending bracket 54 which is connected to the rod end 55 of a second hydraulic tilt cylinder assembly 56 by a double yoke and spherical bearing assembly 57 similar to the connection of the rod end of cylinder assembly 47. The base end of cylinder 56 is connected to the truck frame by a spherical bearing 58. An inwardly facing short channel 70 is secured along its edges to the web of right-hand rail 18 to form a pocket in which member 53 is mounted, and a cutout section 71 in the lower rear leg of short channel 70 of a length sufficiently longer than the height of the horizontal portion of L-shaped member 53 to allow relative movement between members 53 and 70 so as to provide the desired degree of mast side tilt in either direction. A double-acting side tilt cylinder assembly 72 is mounted rearwardly of the right-hand mast elements 18 and 20, the base end of which is pivotally mounted by a pin connection 73 to a double sided bracket 74 which is in turn secured to the horizontal portion of L-shaped bracket 53, the rod end being pivotally secured by a pin and yoke connection 75 to a plate 76 which is in turn secured to right-hand mast element 18 and to the rear leg portions of right-hand mast channels 18 and 70. Transverse tie bars 77 and 78, as shown in FIG. 3, extend in vertically spaced relation between the sides of the mast to rigidify the structure, but for clarity only the upper tie bar 78 is shown in FIGS. 1 and 2. Also, although such tie bars are angled forwardly into the web sections of the outer upright rails 18, as shown best in FIG. 3, the same is not shown in FIG. 5 in the interest of clarity.

The side tilt cylinder 72 is double-acting and when pressurized to extend the piston rod causes the entire mast assembly 16 to pivot about an axis longitudinal of the truck in a clockwise direction as viewed in FIG. 1, and when pressurized to retract causes counterclockwise pivotal movement of the entire mast assembly as shown in FIG. 2. Such side tilt movement is effected by pivotal transverse movement relative to the truck by plate 45 and the horizontal portion of L-shaped member 53 on spherical bearings 34 as relative movement occurs between the said entire mast assembly and the shaft 24, L-shaped member 53 moving slidably up or down in short channel 70 within the upper limit imposed by slot 71. It will be noted that side tilt cylinder assembly 72 remains at all times in the same longitudinal relative position to upright rails 18 and 20, and that forward tilt cylinder assemblies 47 and 56 move in a transverse pivotal direction from the fixed positions of base end spherical bearings 52 and 58 to the transversely movable spherical bearings at the rod end connections of the tilt cylinders to the mast. It will thus be seen that the relative position of the mast assembly transverse of the truck is determined and controlled by the operation of side tilt cylinder 72 with the mast fully supported on the pair of spaced spherical bearings 34 on shaft 24.

The double-acting side tilt cylinder assembly 72 is controlled by the operator in normal operation in rough terrain, such as represented by the traversing position of the truck on a grade as shown in FIG. 2, to maintain in a vertical position the mast assembly during such traversing operation. Of course, opposite actuation of cylinder 72 to extend the piston rod thereof from the FIG. 1 position may be utilized to maintain the mast assembly in a vertical upright position when the truck is traversing a slope opposite to that illustrated in FIG. 2. It will be appreciated that skillful operation of the side tilt cylinder 72 in conjunction with tilt cylinders 47 and 56 facilitates substantially the safe operation of such vehicles in various types of terrain in which it is important to maintain the mast assembly in a vertical or near vertical position. Of course, it is well understood that the load normally handled during truck movements, whether or not in rough terrain, is normally cradled on the fork or other load handling mechanism connected to the mast assembly by retraction of the tilt cylinders 47 and 56 to tilt rearwardly the mast assembly. This operation is, of course, combinable with the operation of side tilt cylinder 72, as may be required.

It will be observed that during side tilt operations of the mast that the entire mast assembly is very simply and efficiently tilted transversely of the truck by means of the mounting thereof on the outer races of the spherical bearings 34 while tilt cylinders 47 and 56 are actuated by such mast movement also transversely of the truck in a slight arc, again by the resulting actuation of the outer races at the opposite ends of each tilt cylinder assembly to which the cylinder and piston rod ends are secured. Forward and rearward tilting of the mast is, of course, accomplished by extension and retraction of the tilt cylinders which actuate the mast on the outer race of bearings 34.

As illustrated in the drawings, although it is not essential to the practice of the invention, as will appear below, the mast assembly isalso is also shiftable on shaft 24 by means of a double-acting, double-rod, center piston cylinder assembly 90 which is secured by a pair of brackets 92 to a sleeve 94 which is bearing mounted on shaft 24, the piston rod ends 96 of which are also mounted at their opposite ends, by a pin and double sided bracket 98 to plate 45 on the left side, and by a pin and elongated portion of double sided bracket 74 to the horizontal leg of member 53 on the right side. Actuation of the piston rod to the right shifts the mast assembly rightwardly on slidable bearings 34 and sleeve 94 along shaft 24, and vice versa. During such side shifting movement the mast tilt cylinders 47 and 56 are shifted transversely arcuately, the degree of such shifting depending upon whether side tilt cylinder 72 is also actuated and in which direction during a following side shift of the mast.

The mast assembly in its entirety including the complete telescopic assembly and hoist motor 18, 20, 22, the side shift cylinder assembly 90 and bearings 34 with shaft 24, and side tilt cylinder assembly 72 may be readily assembled on and disassembled from the truck as a complete unit simply by connection or disconnection, as the case may be, of tilt cylinder rod ends 48 and 55 and lower trunnion brackets 26. This is significant because it greatly simplifies the assembly on lift trucks of mast assemblies having such a complex of controlled movements available in relation to the lift truck.

It will be appreciated that the side shifting capability of the mast assembly may not be desired in many installations because of the increased cost in providing that function. While I have not disclosed a specific embodiment of a mast assembly which is tiltable both forwardly and to side, but not side shiftable, it will be obvious to persons skilled in the art and within the scope of this invention to eliminate the side shift cylinder assembly 90 and associated parts, thereby making unnecessary the provision of shaft 24 and providing the same capabilities as is disclosed above except for side shifting. This may be accomplished, for example, merely by providing a trunnion yoke connection at the front ends of frame members 28 with a stub shaft mounted in each yoke on which is mounted a spherical bearing 34. This is similar in substance to the mounting of the bearing shown in FIG. 6, but would be adapted for the front end of each frame member 28. On the other hand, it may be preferred to mount the mast assembly on shaft 24 without side shift capability, in which event bearings 34 would be affixed and non-slidable on the shaft. Other variations will be apparent.

It will be appreciated that while it may be preferable to provide spherical bearings, or the equivalent thereof, at both ends of both the side tilt and side shift cylinders, that this is a matter of convenience and not a requirement. Simple pin and yoke connections, for example, will suffice at such locations. The function of the spherical bearing, or more generally any universal type bearing is, however, required in the use of my invention for mounting both the rod ends and the base ends of the tilt cylinders 47 and 56 because of the combinations of movements employed in forward or rearward and side tilting of the mast. Likewise in respect of the mounting of the mast on bearings 34.

My invention provides a mast assembly capable of manipulation in all directions necessary to perform load handling operations in rough terrain with relative safety in a structure simpler and more efficient than has been heretofore proposed, and generally less costly. Assembly and disassembly of the mast on the truck has been greatly simplified, as described above. If the mast is constructed without the side shift requirement, the additional simplification is effected.

It is intended in practice that all tilt and side shift functions would be restricted by the use of positive acting solenoid controls which would prevent the operator from accidentally causing any such mast movements, but no such controls form a part of this invention, and so have not been disclosed herein.

Although I have described and illustrated a preferred embodiment of my invention, it will be understood by those skilled in the art that modifications may be made in the structure, form, and relative arrangement of parts without necessarily departing from the spirit and scope of the invention. Accordingly, it should be understood that I intend to cover by the appended claims all such modifications which fall within the scope of the invention.

I claim:

1. In a lift truck having an upright mast assembly mounted from one end of the truck, first bearing means comprising a pair of transversely spaced universal type bearings supported from the truck and supporting the mast assembly for arcuate movement both longitudinally and transversely of the truck, forward tilt means connected to the mast assembly for actuating it arcuately on said first bearing means in a direction longitudinal of the truck, second bearing means connecting said forward tilt means to the truck and to the mast assembly such that said tilt means pivots generally transversely of the truck during transverse arcuate movement of said mast assembly on said first bearing means, and side tilt means for actuating said mast assembly in said transverse arcuate movement on said first bearing means, at least a portion of said forward tilt means being connected to said mast assembly by means movable longitudinally relative to the mast assembly during side tilting movements of the mast.

2. A lift truck as claimed in claim 1 wherein said first bearing means are spherical bearings and said second bearing means comprises at least a pair of spherical bearings.

3. A lift truck as claimed in claim 1 wherein said forward tilt means comprises a pair of transversely spaced hydraulic cylinder means connected to the truck and to opposite sides of the mast assembly each by a pair of said second bearing means.

4. A lift truck as claimed in claim 3 wherein the one tilt cylinder means comprises said portion of the tilt means which is connected to the mast by the relatively movable means and the other tilt cylinder means is connected to the mast by relatively immovable means during side tilting mast movements.

5. A lift truck as claimed in claim 1 wherein said side tilt means comprises a hydraulic cylinder means connected to the mast assembly which extends upwardly adjacent one side of the mast assembly.

6. A lift truck as claimed in claim 5 wherein said mast assembly can be disassembled from said truck following disconnection of said forward tilt means from the mast assembly or from the truck, and disconnection of said first bearing means from the truck.

7. A lift truck as claimed in claim 1 wherein said first bearing means are slidably mounted on a transverse shaft means inwardly of the ends thereof, said shaft means being supported from the truck, and side shift means being connected to said mast assembly for actuating it on said first bearing means along said shaft means and laterally of the truck.

8. A lift truck as claimed in claim 7 wherein said side shift means comprises a hydraulic cylinder means supported from said shaft means.

9. A lift truck as claimed in claim 8 wherein said mast assembly can be disassembled from said truck by disconnecting said transverse shaft means from the truck, and disconnecting said forward tilt means from the mast assembly or from the truck, both said side shift and side tilt means being connected to and carried by said mast assembly.

10. A lift truck as claimed in claim 1 wherein said mast assembly can be disassembled from said truck following disconnection of said forward tilt means from the mast assembly or from the truck and disconnection of said first bearing means from the truck.

11. A lift truck as claimed in claim 1 wherein said universal type bearings are spherical bearings.

12. In a lift truck having an upright mast assembly mounted from one end of the truck, first bearing means comprising a pair of transversely spaced spherical bearings supported from the truck and supporting the mast assembly for arcuate movement both longitudinally and transversely of the truck, forward tilt means connected to the mast assembly for actuating it arcuately on said first bearing means in a direction longitudinal of the truck forwardly and rearwardly of a central position, second bearing means connecting said forward tilt means to the truck and to the mast assembly such that said tilt means pivots generally transversely of the truck during transverse arcuate movement of said mast assembly on said first bearing means, and side tilt means for actuating said mast assembly in said transverse arcuate movement on said first bearing means.

13. A lift truck as claimed in claim 12 wherein said second bearing means comprises spherical bearings, and said forward tilt means comprises a pair of hydraulic tilt cylinder means connected to the truck and to opposite sides of the mast assembly each by a pair of said second bearing means.

14. A lift truck as claimed in claim 12 wherein at least a portion of said forward tilt means is connected to said mast assembly by means movable longitudinally relative to the mast assembly during side tilting movements of the mast.

15. A lift truck as claimed in claim 1 wherein the said connecting means of said tilt means to said mast assembly includes a connecting member supported from one of the universal type bearings at one end and secured to said portion of said forward tilt means at the other end.

16. A lift truck as claimed in claim 15 wherein said connecting member is generally L-shaped, the horizontal portion thereof being secured to said universal type bearing and the vertical portion thereof being secured to said forward tilt means.

17. A lift truck as claimed in claim 15 wherein guide means is secured to one outer lower side portion of the mast for receiving said connecting member.

18. A lift truck as claimed in claim 17 wherein said guide means moves with said mast during side tilting thereof and relative to said connecting member.

19. A lift truck as claimed in claim 15 wherein said side tilt means is operatively connected at its one end to said one of the universal type bearings and its other end to the mast.

20. A lift truck as claimed in claim 1 wherein guide means is secured to the one outer lower side portion of the mast assembly for guiding the mast assembly during said longitudinal movement relative to said portion of said tilt means.

21. A lift truck as claimed in claim 1 wherein said portion of said forward tilt means comprises a first mast tilt actuator means connected at one side of said mast, said tilt means including also a second mast tilt actuator means connected to the other side of the mast by means not movable longitudinally relative to the mast during side tilting movements of the mast.

* * * * *